(12) United States Patent
Lee et al.

(10) Patent No.: US 9,034,521 B2
(45) Date of Patent: May 19, 2015

(54) ANODE MATERIAL OF EXCELLENT CONDUCTIVITY AND HIGH POWER SECONDARY BATTERY EMPLOYED WITH THE SAME

(75) Inventors: Eun Ju Lee, Daejeon (KR); Ji Heon Ryu, Seoul (KR); Inchul Kim, Seoul (KR); HanHo Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 764 days.

(21) Appl. No.: 12/665,653

(22) PCT Filed: Jun. 20, 2008

(86) PCT No.: PCT/KR2008/003521
§ 371 (c)(1),
(2), (4) Date: Oct. 15, 2010

(87) PCT Pub. No.: WO2009/002053
PCT Pub. Date: Dec. 31, 2008

(65) Prior Publication Data
US 2011/0027646 A1    Feb. 3, 2011

(30) Foreign Application Priority Data

Jun. 22, 2007 (KR) .......................... 10-2007-0061324

(51) Int. Cl.
| | | |
|---|---|---|
| *H01M 4/13* | (2010.01) | |
| *H01M 10/0525* | (2010.01) | |
| *H01M 4/131* | (2010.01) | |
| *H01M 4/133* | (2010.01) | |
| *H01M 4/1391* | (2010.01) | |
| *H01M 4/1393* | (2010.01) | |
| *H01M 4/36* | (2006.01) | |
| *H01M 4/02* | (2006.01) | |
| *H01M 4/485* | (2010.01) | |
| *H01M 4/587* | (2010.01) | |

(52) U.S. Cl.
CPC ............ *H01M 10/0525* (2013.01); *H01M 4/02* (2013.01); *H01M 4/131* (2013.01); *H01M 4/133* (2013.01); *H01M 4/1391* (2013.01); *H01M 4/1393* (2013.01); *H01M 4/36* (2013.01); *H01M 4/364* (2013.01); *H01M 4/366* (2013.01); *H01M 4/485* (2013.01); *H01M 4/587* (2013.01); *H01M 2004/021* (2013.01); *H01M 2004/027* (2013.01); *Y02E 60/122* (2013.01)

(58) Field of Classification Search
CPC ............................. H01M 4/583; H01M 4/485
USPC .................................................. 429/121–347
See application file for complete search history.

(56) References Cited

U.S. PATENT DOCUMENTS

| | | | |
|---|---|---|---|
| 6,300,013 B1 | 10/2001 | Yamada et al. | |
| 6,767,669 B2 | 7/2004 | Matsubara et al. | |
| 2003/0211396 A1 | 11/2003 | Kobayashi et al. | |
| 2004/0023117 A1 | 2/2004 | Imachi et al. | |
| 2005/0191550 A1* | 9/2005 | Satoh et al. | 429/217 |

FOREIGN PATENT DOCUMENTS

| | | | | |
|---|---|---|---|---|
| CN | 1 339 834 | | 3/2002 | |
| JP | 10-69922 A | | 3/1998 | |
| JP | 2001-216962 A | | 8/2001 | |
| JP | 2001-243950 A | | 9/2001 | |
| JP | 2002-158139 A | | 5/2002 | |
| JP | 2003-217583 A | | 7/2003 | |
| JP | 2006-66298 A | | 3/2006 | |
| JP | 2006-278282 A | | 10/2006 | |
| KR | 10-2000-0077027 A | | 12/2000 | |
| KR | 10-2002-0015289 A | | 2/2002 | |
| KR | 10-2006-0028327 A | * | 3/2006 | .............. H01M 4/02 |
| WO | WO 2006/050100 A2 | | 5/2006 | |
| WO | WO 2007/066581 A1 | | 6/2007 | |
| WO | WO 2009/061013 A1 | * | 11/2007 | .............. H01M 4/58 |

OTHER PUBLICATIONS

Kim et al. KR 10-2006-0028327 A. Mar. 2006. English machine translation provided by KIPO.*

* cited by examiner

*Primary Examiner* — Kenneth Douyette
*Assistant Examiner* — James Lee
(74) *Attorney, Agent, or Firm* — Birch, Stewart, Kolasch & Birch, LLP

(57) ABSTRACT

Provided is an anode material for an electrode mix comprising a carbon material and a lithium titanium oxide (LTO), wherein a ratio of an average particle size of LTO relative to that of the carbon material is in a range of 0.1 to 20%, and LTO is distributed mainly on a surface of the carbon material. The anode material of the present invention can prevent excessive formation of a SEI film, and is of a high capacity due to a high energy density and exhibits excellent output characteristics and rate characteristics. Further, it has superior electrolyte wettability which consequently results in improved battery performance and life characteristics.

8 Claims, No Drawings

ANODE MATERIAL OF EXCELLENT CONDUCTIVITY AND HIGH POWER SECONDARY BATTERY EMPLOYED WITH THE SAME

FIELD OF THE INVENTION

The present invention relates to an anode material with excellent electrical conductivity and a high-power secondary battery comprising the same. More specifically, the present invention relates to an anode material for an electrode mix comprising a carbon material and a lithium titanium oxide (LTO), wherein a ratio of an average particle size of LTO is in a range of 0.1 to 20% relative to an average particle size of the carbon material and LTO is distributed mainly on a surface of the carbon material; and a high-power secondary battery comprising the same.

BACKGROUND OF THE INVENTION

Technological development and increased demand for mobile equipment have led to a rapid increase in the demand for secondary batteries as an energy source. Among these secondary batteries, lithium secondary batteries having high energy density and voltage are commercially available and widely used. When it is desired to use the secondary battery as a power source for mobile phones, notebook computers, and the like, there is a need for a secondary battery which is capable of stably providing a constant power output. On the other hand, when it is desired to use the secondary battery as a power source for a power tool such as electric drill or the like, there is a need for a secondary battery which is capable of instantaneously providing a high power output and capable of being stable even against external physical impact such as vibration, falling, and the like.

Further, increased environmental concern has drawn a great deal of intensive research on electric vehicles (EVs) and hybrid electric vehicles (HEVs) which are capable of replacing fossil fuel-driven vehicles such as gasoline vehicles and diesel vehicles, one of the primary causes of air pollution. Although nickel-hydrogen ($Ni-H_2$) secondary batteries are largely employed as power sources for EVs and HEVs, numerous studies have been actively made to use lithium secondary batteries having a high-energy density and a high-discharge voltage, consequently with some commercialization potential.

Generally, the lithium secondary battery is made of a structure in which an electrode assembly, composed of a cathode, an anode and a separator interposed therebetween, is impregnated within a lithium salt-containing non-aqueous electrolyte, wherein the cathode and the anode are fabricated by applying electrode active materials to the corresponding current collectors. As the cathode active material, lithium cobalt oxides, lithium manganese oxides, lithium nickel oxides, lithium composite oxides and the like are primarily used. As the anode active material, carbon-based materials are usually used.

However, the lithium secondary battery using a carbon-based material as an anode active material suffers from deterioration of discharge capacity due to the occurrence of irreversible capacity in some of lithium ions inserted into a layered structure of the carbon-based material upon initial charging/discharging of the battery. Further, since the carbon material has a redox potential of 0.1 V which is lower relative to the $Li/Li^+$ potential, decomposition of a non-aqueous electrolyte occurs on the anode surface, and the carbon anode reacts with the lithium metal to form a layer covering the carbon material surface (passivating layer or solid electrolyte interface (SEI) film). The SEI film may also affect charge/discharge characteristics of the battery because thickness and interface conditions of the SEI film are variable depending on the types of electrolyte systems to be employed. Further, in the secondary battery which is used in the fields requiring high output characteristics, such as power tools, the battery internal resistance increases even with such a thin SEI film, which thereby may be a rate determining step (RDS). Further, due to the formation of a lithium compound on the anode surface, the reversible capacity of lithium intercalation gradually decreases with repeated charging/discharging cycles, thus resulting in reduction of the discharge capacity and deterioration of cycle characteristics.

Meanwhile, a great deal of study has been focused on a lithium titanium oxide as a promising candidate for an anode material having structural stability and good cycle characteristics. The lithium secondary battery comprising such a lithium titanium oxide as an anode active material exhibits substantially no electrolyte decomposition due to a relatively high redox potential of the anode of about 1.5 V as compared to the $Li/Li^+$ potential, and excellent cycle characteristics due to stability of the crystal structural. Unfortunately, the lithium titanium oxide has drawbacks such as low capacity per unit weight and low energy density.

In order to cope with such disadvantages and problems, some of conventional prior arts suggest the use of an anode material containing a carbon-based material and a lithium titanium oxide.

For example, Japanese Unexamined Patent Publication No. 1998-069922 discloses an anode with addition of a lithium titanium composite oxide as a major active material and an active material having a low redox potential as a minor active material. Further, Japanese Unexamined Patent Publication No. 2006-278282 discloses a technique with incorporation of spinel-type lithium titanate as an anode active material and a carbon material as a conductive material. However, anode materials using the lithium titanium oxide as a main active material still suffer from the problems associated with poor capacity and low energy density of the lithium titanium-based oxides.

Meanwhile, Japanese Unexamined Patent Publication No. 2001-216962 discloses a technique with incorporation of a carbon material as a major anode material and a lithium titanium composite oxide as an auxiliary active material. Further, Japanese Unexamined Patent Publication No. 2006-066298 discloses a lithium secondary battery comprising a non-aqueous electrolyte with incorporation of at least one lactone having a melting point of below 0° C., wherein an anode active material contains a carbon material capable of performing intercalation and deintercalation of lithium ions and lithium titanate, a content of the carbon material is in a range of 80 to 99% by weight based on the total weight of the anode active material, and a content of lithium titanate is in a range of 1 to 20% by weight.

However, since lithium ion mobility of the carbon material is still low due to use of the carbon material and the lithium titanium oxide in the form of a simple mixture, the above-mentioned conventional arts suffer from the problems associated with sluggish reaction rates and poor large-current characteristics.

To this end, there is an urgent need for development of an anode material which is capable of attaining low internal resistance, high electrical conductivity and excellent output characteristics while compensating for respective disadvantages of the carbon material and the lithium titanium oxide.

SUMMARY OF THE INVENTION

Therefore, it is an object of the present invention to solve the above problems, and other technical problems that have yet to be resolved.

As a result of a variety of extensive and intensive studies and experiments to solve the problems as described above, the inventors of the present invention have discovered that upon fabrication of a secondary battery using an anode material for an electrode mix with distribution of an LTO-based anode material having a given particle size ratio on the surface of a carbon material, the as-prepared secondary battery exhibits low internal resistance leading to a high output density, in conjunction with improved energy density and cycle characteristics, thus providing excellent battery properties. The present invention has been completed based on these findings.

DETAILED DESCRIPTION OF PREFERRED EMBODIMENTS

In accordance with an aspect of the present invention, the above and other objects can be accomplished by the provision of an anode material for an electrode mix comprising a carbon material and a lithium titanium oxide (LTO), wherein a ratio of an average particle size of LTO relative to that of the carbon material is in a range of 0.1 to 20% and the LTO is distributed mainly on a surface of the carbon material.

As described above, the carbon material generally has high discharge capacity, but suffers from shortcomings of poor high-current characteristics and cycle characteristics. However, because LTO having a stable crystal structure and undergoing a negligible volumetric change during charging/discharging cycles is distributed on a surface of the carbon material, the anode material in accordance with the present invention exhibits excellent cycle characteristics, a high redox potential thus decreasing an absolute amount of SEI film formation and consequently internal resistance leading to improvements in rate characteristics and high-current characteristics, and finally excellent wettability of an electrolyte thereby improving the battery performance and lifespan characteristics.

Further, LTO per se can participate as a redox site in chemical reaction of a battery, so battery capacity deterioration is minimized while simultaneously achieving high ionic conductivity and excellent output characteristics due to LTO particles being in direct contact with the carbon material. That is, the anode material in accordance with the present invention alleviates disadvantages of the carbon material and maximizes advantages of the LTO anode material such as low internal resistance and excellent cycle characteristics, so it is possible to fabricate a secondary battery with high efficiency and excellent energy density and output characteristics.

There is no particular limit to the carbon material, as long as it is capable of performing intercalation and deintercalation of lithium ions. For example, mention may be made of a crystalline carbon-based compound, an amorphous carbon-based compound, and a mixture thereof. A typical example of the crystalline carbon-based compound may be graphite. For example, the crystalline graphite carbon may include a potato-shaped or mesocarbon microbead (MCMB)-shaped artificial graphite, and natural graphite which was surface-treated to round edges. Further, the amorphous carbon-based compound is a material having an amorphous crystal structure of carbon atoms and may include, for example, non-graphitizable carbon (hard carbon) obtained as a pyrolytic product of a phenolic resin or furan resin, and graphitizable carbon (soft carbon) obtained from carbonization of coke, needle coke or pitch.

In one preferred embodiment of the present invention, the carbon material may be natural or artificial graphite which has large capacity due to superior density and conductivity, and good output characteristics and rate characteristics due to high energy density, particularly preferably a mesocarbon microbead (MCMB) which is an optically anisotropic spherical particle obtained by heating of coke, pitch, or the like at a temperature of about 400° C.

LTO is preferably a compound represented by the following composition formula (1), and includes, but is not limited to, $Li_{0.8}Ti_{2.2}O_4$, $Li_{2.67}Ti_{1.33}O_4$, $LiTi_2O_4$, $Li_{1.33}Ti_{1.67}O_4$, $Li_{1.14}Ti_{1.71}O_4$, etc. More preferably, LTO is a compound of formula (1) having a spinel structure which undergoes no or substantially no change in the crystal structure during charging/discharging cycles and exhibits excellent reversibility. Preferred is $Li_{1.33}Ti_{1.67}O_4$.

$$Li_xTi_yO_4 \ (0.5 \leq x \leq 3; \text{ and } 1 \leq y \leq 2.55) \quad (1)$$

Such LTO has an operation potential of approx. 1.5V at which electrolyte decomposition and SEI film formation do not take place, which may result in decreased internal resistance. Further, since LTO is distributed on a surface of the carbon material and is then in direct contact with the carbon material, LTO serves as a migration path of lithium ions to thereby improve ionic conductivity. Further, LTO has a stable crystal structure, so it is possible to inhibit cycle deterioration due to separation of lithium ions which results from decomposition of a non-aqueous electrolyte occurring during charging/discharging cycles. In addition, since LTO per se can participate as a redox site in the chemical reaction of the battery and exhibits an efficiency of nearly 99%, this may result in an increased number of reaction sites, significantly improved rate characteristics and excellent wettability of the electrolyte, thereby providing desired battery performance and lifespan characteristics.

LTO can be prepared by any conventional method known in the art. For example, a lithium salt (such as lithium hydroxide, lithium oxide, lithium carbonate, or the like) as a lithium source is dissolved in water, a suitable amount of titanium oxide as a titanium source is added to the aqueous solution of the lithium salt, depending on an atomic ratio of lithium and titanium, and the resulting mixture is stirred and dried to obtain a precursor which is then sintered to prepare a desired LTO compound.

If a content of LTO is excessively high, a content of the carbon material is relatively decreased, which may result in deterioration of the battery capacity and energy density, in conjunction with destruction of the crystal structure and deterioration of discharge capacity arising from liberation of lithium ions from the cathode due to an excessively high operation potential. On the other hand, if a content of LTO is excessively low, it is undesirably difficult to achieve desired addition effects of LTO. With respect to these facts, a content of LTO is preferably in a range of 0.1 to 20% by weight, and more preferably 0.1 to 5% by weight, based on the total weight of the anode material.

In the present invention, LTO particles, as defined above, have an average particle size corresponding 0.1 to 20%, preferably 0.5 to 15% of that of the carbon material.

This is because of the following reasons. If a ratio of an average particle size of LTO is excessively high relative to that of the carbon material, a contact area between LTO and the carbon material on a surface of the carbon material is decreased thus making it difficult to sufficiently improve the ionic conductivity, and a contact area between the electrolyte and the carbon material is increased, which may result in electrolyte decomposition and SEI layer formation. On the other hand, if a ratio of an average particle size of LTO is excessively low, cohesive force between LTO particles is increased, which may result in difficulty to achieve uniform distribution of the LTO particles on the carbon material surface.

If an average particle size of the carbon material is excessively large, this may result in a decreased volume density of the anode material. On the other hand, if an average particle size of the carbon material is excessively small, this may undesirably result in an increased irreversible capacity of the anode material and difficulty to achieve a desired discharge capacity.

Therefore, in one preferred embodiment of the present invention, the carbon material has an average particle size of 5 to 25 µm and the LTO has an average particle size of 0.01 to 5 µm. More preferably, the carbon material has an average particle size of 10 to 20 µm and the LTO has an average particle size of 0.1 to 2 µm. It is to be understood that the average particle size of the carbon material and LTO is selected within the range satisfying the above-specified particle size ratio.

In the present invention, LTO is distributed mainly on the carbon material surface. For example, LTO may be in continuous and uniform distribution throughout the carbon material surface or otherwise may be in discrete particulate phase distribution on the carbon material surface. Preferred is the latter distribution form in terms of easy processability.

As used herein, the phrase "LTO is distributed "mainly" on the carbon material surface" means that a proportion of LTO distributed on the carbon material surface is relatively higher than that of LTO present as an independent phase in the form of a powder alone or an agglomerate of LTO particles. Preferably, the LTO is distributed on at least 50% of a surface area of the carbon material. If a distribution area of LTO is less than 50%, it may be difficult to achieve decreased internal resistance and improved ionic conductivity as desired.

There is no particular limit to the method of preparing the anode material in accordance with the present invention. For example, mention may be made of a method involving coating of a lithium-containing titanium coating solution on the carbon material surface, followed by thermal oxidation, a method involving application of mechanical stress to a carbon material and LTO particles to result in compression and physical attachment of LTO particles to surfaces of the carbon material particles, a method involving precipitation of LTO on surfaces of the carbon material particles by a wet process such as a sol-gel method, followed by heat treatment, or the like.

Preferably, the anode material may be prepared by a method of (i) homogeneously mixing a carbon-based anode active material and LTO particles in the presence of a solvent; and (ii) drying and heat-treating the resulting mixture.

The mixing is carried out by a wet mixing method in the presence of a solvent. When a dry mixing method is employed, an anode active material precursor having a very tiny particle size should be used or a long-term process is required to achieve uniform distribution of LTO particles in the carbon-based anode active material. Therefore, the wet mixing method is preferable in terms of process efficiency.

When a fine metal powder is mixed by the wet mixing method, an alcohol may be preferably used as a solvent. If necessary, a surfactant may be further added to the solvent in order to prevent possible aggregation of LTO particles in the solvent. The surfactant may be a conventional one known in the art.

There is no particular limit to the method of preparing the carbon-based anode active material and LTO particles. Therefore, any conventional method known in the art may be used as described before.

As described before, the LTO particles are added in a proper amount taking into consideration ionic conductivity, kinds of active materials, and the like. Preferably, a content of the LTO particles is in a range of 0.1 to 20% by weight, more preferably 0.1 to 5% by weight, based on the total weight of the anode mixture.

There is no particular limit to the drying process. For example, the drying process may be carried out conventionally by spray drying, granulating and drying, freeze-drying or any combination thereof.

The heat treatment process may be carried out under vacuum or an inert atmosphere. Preferably, the heat treatment process is carried out under an inert atmosphere. In order to achieve uniform distribution and stable attachment of LTO particles on a surface of the carbon material, the heat treatment process may be carried out preferably at a temperature of 100 to 700° C. for 1 to 24 hours, more preferably at a temperature of 200 to 300° C. for 2 to 5 hours.

In accordance with another aspect of the present invention, there is provided an anode for a secondary battery comprising the aforesaid anode material applied to a current collector. For example, the anode can be fabricated by applying an anode mix containing the aforesaid anode material, a binder and/or a conductive material to the current collector.

The binder is a component assisting in binding between the anode material and the conductive material, and in binding of the anode material to the current collector. The binder is typically added in an amount of 1 to 50% by weight, based on the total weight of the mixture containing the anode material. As examples of the binder that may be utilized in the present invention, mention may be made of polytetrafluoroethylene (PTFE), polyvinylidene fluoride (PVdF), cellulose, polyvinyl alcohols, carboxymethylcellulose (CMC), starch, hydroxypropylcellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, various copolymers, and polyvinyl alcohols having a high molecular weight and a high degree of saponification.

There is no particular limit to the conductive material, so long as it has suitable conductivity without causing chemical changes in the fabricated battery. As examples of the conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives. Specific examples of commercially available conductive materials may include various acetylene black products (available from Chevron Chemical Company, Denka Singapore Private Limited and Gulf Oil Company), Ketjen Black EC series (available from Armak Company), Vulcan XC-72 (available from Cabot Company) and Super P (Timcal Co.).

Where appropriate, the anode mix may optionally contain a filler, an adhesive accelerator, and the like.

The filler is added as an ingredient to inhibit anode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fibers and carbon fibers.

The adhesive accelerator is an auxiliary component used to improve adhesive strength of the active material to the current collector, and may be added in an amount of less than 10% by weight, based on the weight of the binder. Examples of the adhesive accelerator that can be used in the present invention may include oxalic acid, adipic acid, formic acid, acrylic acid derivatives, itaconic acid derivatives and the like.

The anode is generally fabricated by adding the anode mix to a solvent to thereby prepare an electrode slurry and applying the resulting slurry to a current collector such as metal foil, followed by drying and pressing to prepare a sheet-like electrode.

Preferred examples of solvents used in preparation of the electrode slurry may include dimethyl sulfoxide (DMSO), alcohol, N-methyl pyrrolidone (NMP), acetone, etc. The solvent may be used in an amount of up to 400% by weight, based on the total weight of the electrode mix, and is removed during the drying process.

The anode current collector is generally fabricated to have a thickness of 3 to 500 μm. There is no particular limit to the anode current collector, so long as it has suitable conductivity without causing chemical changes in the fabricated battery. As examples of the anode current collector, mention may be made of copper, stainless steel, aluminum, nickel, titanium, sintered carbon, copper or stainless steel having a surface treated with carbon, nickel, titanium or silver, and aluminum-cadmium alloys. The anode current collector may also be processed to form fine irregularities on the surface thereof so as to enhance adhesion to the anode active material. In addition, the anode current collector may take various forms including films, sheets, foils, nets, porous structures, foams and non-woven fabrics.

Uniform application of the anode mix paste to the anode current collector may be carried out by conventional methods known in the art or appropriate novel methods, taking into consideration physico-chemical properties of materials to be used. For example, preferably the electrode paste is distributed onto the current collector and is then uniformly dispersed thereon using a doctor blade or the like. Where appropriate, distribution and dispersion of the electrode paste may also be carried out in a single step. Further, application of the electrode paste may be carried out by a method selected from die casting, comma coating, screen printing and the like. Alternatively, application of the electrode paste may be carried out by molding the paste on a separate substrate and then binding it to the current collector via pressing or lamination. Drying of the paste applied over the current collector is preferably carried out in a vacuum oven at 50 to 200° C. for 1 to 3 days.

In accordance with yet another aspect of the present invention, there is provided an electrochemical cell comprising the aforesaid anode.

The electrochemical cell is a device which provides electricity by an electrochemical reaction and may be preferably a high-power lithium secondary battery comprising a lithium salt-containing non-aqueous electrolyte. The lithium secondary battery may be made of a structure in which an electrode assembly, composed of the aforesaid anode, a cathode, and a separator interposed therebetween, is impregnated within a lithium salt-containing non-aqueous electrolyte.

Hereinafter, other components necessary for fabrication of the lithium secondary battery in accordance with the present invention will be described in more detail.

The cathode is, for example, fabricated by applying a cathode mix containing a cathode active material to a cathode current collector, followed by drying.

The cathode current collector is generally fabricated to have a thickness of 3 to 500 μm. There is no particular limit to the cathode current collector, so long as it has high conductivity without causing chemical changes in the fabricated battery. As examples of the cathode current collector, mention may be made of stainless steel, aluminum, nickel, titanium, sintered carbon, and aluminum or stainless steel which was surface-treated with carbon, nickel, titanium or silver. The anode current collector may also be processed to have fine irregularities on the surface thereof so as to enhance adhesion to the cathode active material. In addition, the current collector may take various forms including films, sheets, foils, nets, porous structures, foams and non-woven fabrics.

Examples of the cathode active materials that can be used in the present invention may include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+y}Mn_{2-y}O_4$ ($0 \le y \le 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; Ni-site type lithium nickel oxides of Formula $LiNi_{1-y}M_yO_2$ (M=Co, Mn, Al, Cu, Fe, Mg, B, or Ga, and $0.01 \le y \le 0.3$); lithium manganese composite oxides of Formula $LiMn_{2-y}M_yO_2$ (M=Co, Ni, Fe, Cr, Zn, or Ta, and $0.01 \le y \le 0.1$), or Formula $Li_2Mn_3MO_8$ (M=Fe, Co, Ni, Cu, or Zn); $LiMn_2O_4$ wherein a portion of Li is substituted with alkaline earth metal ions; disulfide compounds; $Fe_2(MoO_4)_3$; $LiFe_3O_4$, etc.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or a glass fiber or polyethylene, which have chemical resistance and hydrophobicity, are used. When a solid electrolyte such as a polymer is employed as the electrolyte, the solid electrolyte may also serve as both the separator and electrolyte.

The lithium salt-containing non-aqueous electrolyte is composed of an electrolyte and a lithium salt. As the electrolyte, a non-aqueous organic solvent, an organic solid electrolyte or an inorganic solid electrolyte may be utilized.

As the non-aqueous organic solvent that can be used in the present invention, for example, mention may be made of aprotic organic solvents such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

The lithium secondary battery in accordance with the present invention may be preferably used as a unit cell for high-power battery cells or high-power, high-capacity medium-sized and large-sized battery packs.

That is, through the use of a carbon-based material having LTO with a given particle size ratio distributed on a surface thereof as an anode active material, the lithium secondary battery in accordance with the present invention can exhibit an advantage of the carbon-based material, e.g. high capacity, simultaneously with excellent cycle characteristics and low internal resistance leading to superior rate characteristics, consequently exerting high output characteristics. For these reasons, the lithium secondary battery in accordance with the present invention can be preferably used in battery systems as a power source for electric-powered tools, electric vehicles (EVs) and hybrid electric vehicles (HEVs) forced to be in operation under severe conditions.

EXAMPLES

Now, the present invention will be described in more detail with reference to the following Examples. These examples are provided only for illustrating the present invention and should not be construed as limiting the scope and spirit of the present invention.

Example 1

99.9% by weight of mesocarbon microbead (MCMB) having an average particle size of 20 μm as a graphite-based anode active material and 0.1% by weight of LTO particles having an average particle size of 2 μm were mixed and thoroughly stirred in ethanol. Then, the mixture was dried and heat-treated in an electric furnace at 300° C. for 3 hours under a nitrogen atmosphere to prepare an anode material. The FESEM image showed that the LTO particles, having a particle size ratio corresponding to 10% of that of MCMB particles, were uniformly distributed on surfaces of the MCMB particles.

The as-prepared anode material, Super P as a conductive material, and polyvinylidene fluoride (PVdF) as a binder were mixed in a weight ratio of 92:2:6, and N-methyl pyrrolidone (NMP) was added to the mixture, thereby preparing a slurry. The resulting anode slurry was applied to a copper current collector which was then dried in a vacuum oven at 120° C., thereby fabricating an anode.

Further, $LiCoO_2$ as a cathode active material, Super P as a conductive material and PVdF as a binder were mixed in a weight ratio of 92:4:4, and the mixture was dispersed in N-methyl pyrrolidone (NMP). The resulting dispersion was coated on aluminum (Al) foil, thereby fabricating a cathode.

An electrode assembly was fabricated using the thus-fabricated anode and cathode, and a porous polypropylene separator disposed therebetween. The electrode assembly was placed in a pouch-type case to which electrode leads were then connected. Thereafter, as an electrolyte, a solution of 1M $LiPF_6$ in ethylene carbonate (EC) and dimethyl carbonate (DMC) (1:1, v/v) was injected thereto, followed by hermetically sealing the battery case to thereby fabricate a lithium secondary battery.

Example 2

A lithium secondary battery was fabricated in the same manner as in Example 1, except that 99% by weight of MCMB and 1% by weight of LTO particles were mixed to prepare an anode material.

Comparative Example 1

A lithium secondary battery was fabricated in the same manner as in Example 1, except that LTO was not added and MCMB was added alone as an anode material.

Experimental Example 1

For batteries fabricated in Examples 1 and 2 and Comparative Example 1, discharge capacity (charged at 1C rate) of each battery was measured at 1C, 1.5C, 2C and 3 C rates, and a ratio of the discharge capacity at the respective C-rates relative to the discharge capacity at the 1C rate was calculated. The results thus obtained are given in Table 1 below.

TABLE 1

| C-rate | 1 C | 1.5 C | 2 C | 3 C |
|---|---|---|---|---|
| Comp. Ex. 1 | 98.93 | 96.8 | 93.3 | 82.6 |
| Ex. 1 | 98.96 | 97.3 | 94.7 | 85.5 |
|  | (+0.03) | (+0.5) | (+1.4) | (+2.9) |
| Ex. 2 | 99.3 | 97.8 | 95.8 | 89.9 |

As shown in Table 1, the batteries of Examples 1 and 2 in accordance with the present invention exhibited remarkably excellent C-rate characteristics, as compared to the battery with no addition of LTO particles in Comparative Example 1. Particularly, the battery of Example 2 with a high content of LTO was superior in the C-rate characteristics. Further, it can be seen that such improvements of C-rate characteristics were achieved even at a low C-rate of 1C, and higher C-rates resulted in significantly higher improvements of discharge characteristics.

These results are believed to be due to that uniform distribution of LTO particles on the carbon material surface, in the batteries of Examples in accordance with the present invention, leads to excellent ionic conductivity while compensating for a relatively low electrical conductivity of LTO, as compared to the battery with no incorporation of LTO particles.

Example 3

97.5% by weight of MCMB having an average particle size of 22 μm and 2.5% by weight of LTO particles having an average particle size of 1.8 μm were mixed and thoroughly stirred in ethanol. Then, the mixture was dried and heat-treated in an electric furnace at 400° C. for 3 hours under a nitrogen atmosphere to prepare an anode material. Using the as-prepared anode material, a lithium secondary battery was fabricated in the same manner as in Example 1.

Comparative Example 2

97.5% by weight of MCMB having an average particle size of 22 μm and 0.1% by weight of LTO particles having an average particle size of 1.8 μm were simply mixed in the absence of a solvent to prepare an anode material. Using the as-prepared anode material, a lithium secondary battery was fabricated in the same manner as in Example 1.

Comparative Example 3

A lithium secondary battery was fabricated in the same manner as in Comparative Example 2, except that LTO was not added and MCMB was added alone as an anode material.

Experimental Example 2

For batteries prepared in Example 3 and Comparative Examples 2 and 3, discharge capacity (charged at 1C rate) of each battery was measured at different rates of 0.2C, 1C and 2C, and was then calculated as a ratio relative to the 0.2C rate capacity. The results thus obtained are given in Table 2 below.

TABLE 2

| C-rate | 0.2 C (%) | 1 C/0.2 C (%) | 2 C/0.2 C (%) |
| --- | --- | --- | --- |
| Ex. 3 | 100 | 96.43 | 92.36 |
| Comp. Ex. 2 | 100 | 93.28 | 88.56 |
| Comp. Ex. 3 | 100 | 86.10 | 80.11 |

As shown in Table 2, the battery of Example 3 in accordance with the present invention exhibited remarkably excellent C-rate characteristics, as compared to the battery of Comparative Example 2 using a simple mixture of LTO particles with the carbon material as well as to the battery of Comparative Example 3 with no addition of LTO particles. In particular, it can be seen that a higher C-rate resulted in significantly higher improvements of discharge characteristics.

Experimental Example 3

Based on an average particle size of MCMB in the range of 5 to 25 μm, a variety of anode materials (MCMB:LTO particles=95% by weight:5% by weight) were prepared with different average particle sizes of LTO particles as set forth in Table 3 below. Analogously to Example 1, a large number of lithium secondary batteries were fabricated and measured for discharge capacity at 0.5C and 3C rates. The results are averaged and given in Table 3 below. A size of LTO particles in Table 3 was given as a percentage relative to an average particle size of MCMB. For ease of comparison, a ratio of the 3C-rate discharge capacity relative to the 0.5C-rate capacity was expressed as a relative value taking the value of Example 9 to be 100%. In connection with Example 9, an average particle size of LTO was 10% of that of MCMB.

TABLE 3

| | LTO particle size (%) | 3 C/0.5 C (%) |
| --- | --- | --- |
| Ex. 4 | 0.05 | 84 |
| Ex. 5 | 0.1 | 91 |
| Ex. 6 | 0.5 | 95 |
| Ex. 7 | 1 | 96 |
| Ex. 8 | 5 | 99 |
| Ex. 9 | 10 | 100 |
| Ex. 10 | 15 | 96 |
| Ex. 11 | 20 | 92 |
| Ex. 12 | 30 | 85 |

As shown in Table 3, under the conditions that an average particle size of LTO particles is in a range of about 0.1% to 20% of an average particle size of MCMB, the batteries exhibited discharge capacity ratios of at least 90%. Particularly when an average particle size of LTO particles was in a range of about 0.5% to 15%, the batteries exhibited discharge capacity ratios of 95% or more.

INDUSTRIAL APPLICABILITY

As apparent from the above description, the use of an anode material for an electrode mix, which features the distribution of LTO having a given particle size ratio on a surface of a carbon material, results in high ionic conductivity and low internal resistance of the anode active material, thus increasing the reaction rate. Therefore, an electrochemical cell comprising such an anode material, such as a secondary battery, exhibits high capacity and excellent output characteristics, which consequently results in excellent battery characteristics, e.g. improved output density and energy density.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An anode material for an electrode mix comprising:
a mesocarbon microbead (MCMB) as a carbon material; and
a lithium titanium oxide (LTO);
wherein the MCMB has an average particle size of 5 to 25 μm; the LTO has an average particle size of 0.01 to 5 μm; the average particle size of the LTO is in the range of 0.5 to 15% of the average particle size of the MCMB; a content of the LTO is 5% by weight, based on the total weight of the anode material; the LTO is distributed on at least 50% of the total surface area of the MCMB; and the LTO is distributed in the particulate phase on the MCMB surface,
wherein said anode material is prepared by a method comprising the steps of:
(i) homogeneously mixing the MCMB and LTO particles in the presence of a solvent; and
(ii) drying and heat-treating the resulting mixture.

2. The anode material according to claim 1, wherein the LTO is $Li_{1.33}Ti_{1.67}O_4$.

3. The anode material according to claim 1, wherein the MCMB has an average particle size of 10 to 20 μm and the LTO has an average particle size of 0.1 to 2 μm.

4. An anode for a secondary battery comprising an anode material of claim 1 applied to a current collector.

5. An electrochemical cell comprising an anode of claim 4.

6. The electrochemical cell according to claim 5, wherein the electrochemical cell is a lithium secondary battery comprising a lithium salt-containing non-aqueous electrolyte.

7. A method for preparing an anode material of claim 1, comprising:
   (i) homogeneously mixing a mesocarbon microbead (MCMB) as a carbon material and LTO particles in the presence of a solvent, wherein a ratio of MCMB:LTO particles is 95% by weight:5% by weight; and
   (ii) drying and heat-treating the resulting mixture.

8. The method according to claim 7, wherein the heat-treating is carried out at a temperature of 100 to 600° C. for 1 to 24 hours.

\* \* \* \* \*